US006584934B1

(12) United States Patent
Willan

(10) Patent No.: US 6,584,934 B1
(45) Date of Patent: Jul. 1, 2003

(54) HABITAT FOR CAGED ANIMALS

(75) Inventor: Peter Cliff Willan, Leicester (GB)

(73) Assignee: University of Leicester (GB)

( * ) Notice: Subject to any disclaimer, the term of this patent is extended or adjusted under 35 U.S.C. 154(b) by 0 days.

(21) Appl. No.: 09/630,909

(22) Filed: Aug. 2, 2000

Related U.S. Application Data

(63) Continuation of application No. PCT/GB99/02521, filed on Aug. 4, 1999.

(30) Foreign Application Priority Data

| Aug. 4, 1998 | (GB) | 9816852 |
|---|---|---|
| Feb. 18, 1999 | (GB) | 9903675 |

(51) Int. Cl.[7] ............................................. A01K 1/015
(52) U.S. Cl. .................... 119/171; 119/479; 119/526
(58) Field of Search ........................... 119/171, 172, 119/347, 417, 474, 526, 452, 479; 426/2

(56) References Cited

U.S. PATENT DOCUMENTS

| 3,921,581 A | * | 11/1975 | Brewer | 119/171 X |
|---|---|---|---|---|
| 3,964,438 A | * | 6/1976 | Rodemeyer | 119/526 X |
| 4,448,151 A | | 5/1984 | Lowe | |
| 4,553,671 A | * | 11/1985 | Cheesman | 119/172 X |
| 4,676,196 A | * | 6/1987 | Lojek et al. | 119/171 X |
| 5,347,950 A | * | 9/1994 | Kasbo et al. | 119/171 |
| 5,765,508 A | * | 6/1998 | Markowitz | 119/707 |
| 5,792,470 A | * | 8/1998 | Baumgardner, Sr. | 426/2 X |
| 5,964,187 A | * | 10/1999 | Willis | 119/171 |

FOREIGN PATENT DOCUMENTS

EP 0310016 4/1989

OTHER PUBLICATIONS

IAT Bulletin, vol. 34, No. 11, Nov. 1998, Congress '99, Cyprus 3rd–6th Mar. 1999, Provisional Platform Programme.

* cited by examiner

*Primary Examiner*—Robert P. Swiatek
(74) *Attorney, Agent, or Firm*—Lerner, David, Littenberg, Krumholz & Mentlik, LLP

(57) ABSTRACT

A habitat for caged animals such as nesting rodents. An envelope, penetrable by gnawing or chewing, is constructed of biodegradable, edible or food grade material, which contains litter and may also contain foodstuffs, medicaments or toys.

15 Claims, 1 Drawing Sheet

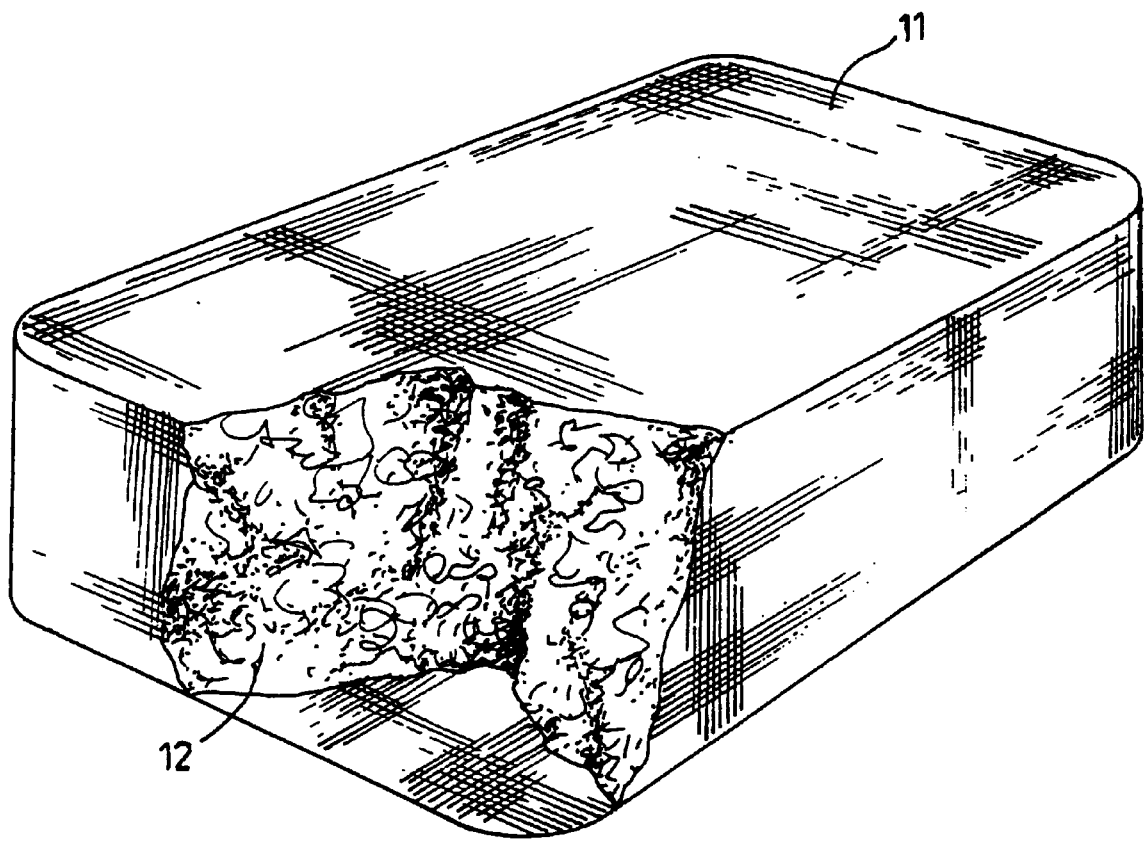

HABITAT FOR CAGED ANIMALS

This application is a continuation of international patent application no. PCT/GB99/02521, filed on Aug. 4, 1999.

This invention relates to habitat for caged animals such as nesting rodents.

Conventionally, caged animals including laboratory animals and rodents such as mice, rats, hamsters and gerbils are kept in an enclosure in the form of a box or glass-walled tank, strewn with litter.

The rodents burrow into the litter to make nest spaces and also separate areas for their excreta. The litter becomes soiled and needs constant replacement. Particularly in a laboratory environment, this is a labour-intensive operation. Where numbers of animals are kept, there is always a risk of cross-infection from enclosure to enclosure if cleaning implements and materials are used incautiously, and animals may react to changes in the comfort quality of litter changes, either because a different material is used or because of differences in the way different attendants introduce new litter to an enclosure.

Thus far the market has been relatively conservative in its demands for animal bedding products, and to a certain extent the products such as wood bedding, hemp, corn etc have been presented in an open format and dispensed with scoops into the animal cages.

There are no set volumes for the amount needed used within the various size cages, so it has to a greater degree been at the discretion of the dispensing worker. Therefore this can lead to overfilling or underfilling which may have adverse effects on the welfare of the animals within a given cage and also has the inherent problem of budget costs (value for money).

The continued developments of isolator technology and individual ventilated cage systems pose their own additional problems, and increased concerns of allergen controls have made the dispensing and removal of cage bedding a much more critical process.

The present invention addresses these problems.

The invention comprises habitat for caged animals, for example nesting rodents, comprising a penetrable envelope containing litter.

The envelope may be penetrable by gnawing or chewing, and may be biodegradable, and edible, or of food grade material. A woven or non-woven fabric of a natural or reconstituted cellulose fibre or depending on application a porous plastic sheet may be used for example.

The liner may also be biodegradable and, desirably, absorbent. It, too, may be of cellulosic material such as, for example, paper, sawdust e.g. dust-free whitewood sawdust, crushed corn cob, hemp, or of pelleted cellulosic material such as is used for cat litter.

The envelope may also contain additional substances or "enrichment products" for example foodstuffs or other ingredients such as medicaments or toys such as cardboard tubes. Thus a habitat may be provided containing foodstuff laced with antibiotics to effect treatment of an unwell animal.

The present invention is particularly suitable for a modern retail environment such as supermarkets, providing sealed unit envelopes containing litter which are suitable for packaging and presentation on shelves and display units.

One embodiment of habitat according to the invention will now be described with reference to the accompanying drawing, in which the single Figure is a part cutaway perspective view.

The habitat comprises a penetrable envelope 11 containing litter 12.

The envelope 11 is of a perforate paper mesh, akin to a large tea bag, though any of a variety of other materials that may be air permeable, biodegradable, chewable, edible or food grade, for example a perforate bread wrapping, may serve.

The litter 12 is for example of white wood sawdust, but could be of shredded or pelleted paper or any other material conventionally used for animal litter. It is preferably absorbent so that soil areas do not become waterlogged.

In use, the litter-filled envelope 11 is simply placed at the bottom of an animal enclosure. Rodents will readily chew through the envelope 11 and burrow into the litter 12 for nesting and soil areas.

Because the habitat is a manufactured item rather than a bulk supply of litter, stricter controls can apply as to depth of litter, packing density and so forth, and various additives can be used for purposes of environmental enhancement.

Cleaning cages, tanks and other enclosures is simplified as the need to sweep or shovel can be greatly reduced—the remains of the filled envelope and its contents merely has to be lifted out, any fauna inhabiting the same coaxed out, and a fresh habitat—which can be essentially guaranteed identical with the old one, dropped into the enclosure, the fauna being then reintroduced to make new nesting and soil areas.

Risk of cross infection may be reduced because cleaning out an enclosure can be simplified as the old habitat can easily be removed and a new one dropped in place depending on local practices.

In the domestic environment, cleaning out becomes less of a chore, hence is less likely to be avoided, while pets are assured of a uniform standard habitat.

The dimensions of the habitat can be chosen to be suitable for any particular rodent, or a universal model can be made that will serve for the larger animals as well as the smaller ones. Probably, a depth of 10 cm will serve for most burrowing rodents (except rabbits, of course and rodents such as coypu which, in captivity, probably don't burrow in any event) the other dimensions corresponding to those of, say, laboratory standard enclosures or domestic pet enclosures for which the habitat may be specifically designed.

Experiments (below have also been performed to test the acceptability and usefulness of the habitat of the present invention (also referred to as "Nestpaks").

Overview

Male and female Wistar Rats and MF1 mice at different ages were placed in various cage systems, including a triple preference unit. They where observes with sawdust alone, sawdust and shredded paper and sealed test packs, in single cages with only one product at a time, and in a preference system, where they were allowed to choose the product to inhabit.

When given no choice (single cages) sawdust alone did not create much activity apart from "hotel syndrome", whereas when given shredded paper, most animals made some form of nest. When the sealed test packs were presented, a much greater amount of activity was observed, with the animals chewing and burrowing into the packs. In all cases they dispersed the sawdust around the cage and made some form of nest with the paper sacking.

When given a choice (preference system) in which each of the three products were presented in one of the three cages, there was a great deal of activity observed, and in all cases the sealed nest packs caused enough interest to encourage the animals to tear open and dispense the sawdust and utilise the pack as nesting material.

The trails have proved conclusively that the sealed Nestpak can provide the animals with a valuable stimulus to their environment, whilst being extremely labour saving in storage and dispensing into the cages in both open and enclosed caging systems.

EXPERIMENTS

Test packs were produced and placed into two tecniplast 2154 makrolon cages to make simple visual observations to assess whether rodents would display any interest in sealed pack as follows;
Cage 1: housed 10 adult female B6CBF mice
The mice gnawed body size holes into the packs, and spent their initial time borrowing, and eventually emptied the sawdust and dispersed it around the cage and manufactured a nest from the paper.
Cage 2: housed 3 adult male SHR rats
The initial response from the rats was to systematically chew open a large hole in the pack and within the first hour had totally removed the sawdust from the pack and dispensed it around the cage. By the following day they had made a nest out of the paper sack.
Materials and Methods
Animals

- Male and Female Wistar Rats @ 8–10 weeks
- Male and Female Wistar Rats @ 3–4 weeks
- Female Wistar Rats with litters
- Male and Female MF1 Mice @ 6–8 weeks
- Male and Female MF1 Mice @ 3–4 weeks
- Female MF1 Mice with litters Husbandry
All animals were fed ad-libitum on expanded rat diet and water and housed within the criteria setout within the Home Office Guidelines on the Housing and Care of Animals, Animals (Scientific Procedures) Act 1986 ISBN 0-10-210789
Types of Materials Tested
Three types on material were to be used in the trials all supplied by Datesand UK 1. Sawdust (Grade 5 dustfree)
2. Sawdust and Shredded perforated paper (similar to that used in teabag manufacture)
3. Nestpaks (sealed paper sack containing Grade 5 dustfree sawdust)

Observations
Each bedding product was evaluated against 6 animal behavioral activities as well as open comments made by the animal welfare staff
1. Hotel Syndrome
This is the term given to the activity shown by animals when placed into a new or changed environment, and is usually typified by activities such as pacing from one end of the cage to the other, pacing around the perimeter of the cage, climbing on to the inner surface of the cage lid, burrowing and redistribution of the bedding and nesting materials.
This type of behaviour is a constant norm within most animal cages and was therefore the first activity to be monitored in these trials against all the bedding and nesting materials to be assessed.
2. Burrowing
3. Distribution of Contents
4. Nesting
5. Grooming
6. Resting Cage Systems 1. Single Tecniplast 2154 NKP makrolon cages
2. Single NKP M1 makrolon cages
3. Preference system consisting of 3 Tecniplast 2154 makrolon cages interlinked with perspex tunnels Single Cage Systems Single Tecniplast 2154 NKP M1 makrolon cages and single NKP M1 makrolon cages fitted with a stainless gridded top with indwelling diet and water hoppers, were used for individual non-choice trials.

To acclimatise the animals prior to the trials they were all (expect for nursing females) housed in their regular cages on sawdust only, for 48 hours, prior to trial materials being introduced.

The animals were then presented with the test materials on a 48 hour rotation basis (trials 1 to 3 inclusive)

TABLE 1

Trial 1
Cage Type - Normal Tecniplast 2154

| Cage No. | Days 1 & 2 | Days 3 & 4 | Days 5 & 6 | Days 7 & 8 |
|---|---|---|---|---|
| No. 1<br>3 Male<br>Wistar Rats @<br>8–10 weeks | Sawdust | Nestpak | Sawdust<br>Nesting<br>Material | Nestpak |
| No. 2<br>3 Female<br>Wistar Rats @<br>8–10 weeks | Sawdust | Nestpak | Sawdust<br>Nesting<br>Material | Nestpak |
| No. 3<br>3 Male &<br>3 Female<br>Wistar Rats @<br>3–4 weeks | Sawdust | Nestpak | Sawdust<br>Nesting<br>Material | Nestpak |
| No. 4<br>1 Female<br>Wistar Rat @<br>With litter | Nestpak<br>Do not<br>remove | Nestpak<br>Do Not<br>Remove | Sawdust<br>Nesting<br>Material<br>Do not<br>remove | Sawdust<br>Nesting<br>Material<br>Do not<br>remove |

TABLE 2

Trial 2
Cage Type - Normal Tecniplast 2154

| Cage No. | Days 1 & 2 | Days 3 & 4 | Days 5 & 6 | Days 7 & 8 |
|---|---|---|---|---|
| No. 1<br>10 Male<br>MF1 Mice<br>@ 6–8 weeks | Sawdust | Nestpak | Sawdust<br>Nesting<br>Material | Nestpak |
| No. 2<br>10 Female<br>MF1 Mice<br>@ 6–8 weeks | Sawdust | Nestpak | Sawdust<br>Nesting<br>Material | Nestpak |
| No. 3<br>2 Male &<br>2 Female<br>MF1 Mice<br>@ 3–4 weeks | Sawdust | Sawdust | Sawdust<br>Nesting<br>Material | Nestpak |
| No. 4<br>1 Female<br>MF1 Mouse<br>with litter | Nestpak | Nestpak<br>Do not<br>remove | Sawdust<br>Nesting<br>Material | Sawdust<br>Nesting<br>Material<br>Do not<br>remove |

TABLE 3

Trial 3
Cage Type - Normal NKP M1

| Cage No. | Days 1 & 2 | Days 3 & 4 | Days 5 & 6 | Days 7 & 8 |
|---|---|---|---|---|
| No. 1<br>3 Male<br>MF1 Mice<br>@ 6–8 weeks | Sawdust | Nestpak | Sawdust<br>Nesting<br>Material | Nestpak |
| No. 2<br>3 Female<br>MF1 Mice<br>@ 6–8 weeks | Sawdust | Nestpak | Sawdust<br>Nesting<br>Material | Nestpak |
| No. 3<br>2 Male &<br>2 Female<br>MF1 Mice<br>@ 3–4 weeks | Sawdust | Nestpak | Sawdust<br>Nesting<br>Material | Nestpak |
| No. 4<br>1 Female<br>MF1 Mouse<br>With litter | Nestpak | Nestpak<br>Do not<br>remove | Sawdust<br>Nesting<br>Material | Sawdust<br>Nesting<br>Material<br>Do not<br>remove |

Preference Systems

Three Preference system units consisting of 3 Tecniplast 2154 makrolon cages interlinked with 70 mm$^{sq}$×450 mm perspex tunnels with an opening port to place the animals into the unit, rather than into any particular cage. This was to ensure repeatability of entry to the system. Each cage was a standard Tecniplast 2154 fitted with a stainless gridded top with indwelling diet and water hoppers with an interlocking port fitted into each of them. For the purpose of the trials an equal amount of diet and water was presented to each cage.

To acclimatise the animals prior to entering the trials they were all (except for nursing females) housed in their regular cages on sawdust only, for 48 hours, and when placed into the preference system all three cages consisted of sawdust only for the 48 hours prior to trial materials being introduced.

During the trial periods each of the 3 materials was placed into a different cage every 48 hours incase the animals displayed a preference for a certain cage (trials 4 to 11 inclusive)

TABLE 4

Trial 4
Cage Type: Preference System No. 1
Animals: 3 Male Wistar Rats @ 8–10 weeks

| Preference Cage No. | Days 1 & 2 | Days 3 & 4 | Days 5 & 6 | Days 7 & 8 |
|---|---|---|---|---|
| No. 1 | Sawdust | Nestpak | Sawdust<br>Nesting<br>Material | Sawdust |
| No. 2 | Sawdust | Sawdust | Nestpak | Sawdust<br>Nesting<br>Material |
| No. 3 | Sawdust | Sawdust<br>Nesting<br>Material | Sawdust | Nestpak |

TABLE 5

Trial 5
Cage Type: Preference System No. 2
Animals: 3 Female Wistar Rats @ 8–10 weeks

| Preference Cage No. | Days 1 & 2 | Days 3 & 4 | Days 5 & 6 | Days 7 & 8 |
|---|---|---|---|---|
| No. 1 | Sawdust | Nestpak | Sawdust<br>Nesting<br>Material | Sawdust |
| No. 2 | Sawdust | Sawdust | Nestpak | Sawdust<br>Nesting<br>Material |
| No. 3 | Sawdust | Sawdust<br>Nesting<br>Material | Sawdust | Nestpak |

TABLE 6

Trial 6
Cage Type: Preference System No. 3
Animals: 3 Male and 3 Female Wistar Rats @ 3–4 weeks

| Preference Cage No. | Days 1 & 2 | Days 3 & 4 | Days 5 & 6 | Days 7 & 8 |
|---|---|---|---|---|
| No. 1 | Sawdust | Nestpak | Sawdust<br>Nesting<br>Material | Sawdust |
| No. 2 | Sawdust | Sawdust | Nestpak | Sawdust<br>Nesting<br>Material |
| No. 3 | Sawdust | Sawdust<br>Nesting<br>Material | Sawdust | Nestpak |

TABLE 7

Trial 7
Cage Type: Preference System No. 1
Animals: 1 Female Wistar Rat with litter

| Preference Cage No. | Days 1 & 2 | Days 3 & 4 | Days 5 & 6 | Days 7 & 8 |
|---|---|---|---|---|
| No. 1 | Sawdust | Sawdust<br>Nesting<br>Material | Nestpak | Nestpak |
| No. 2 | Sawdust<br>Nesting<br>Material | Nestpak | Sawdust | Nestpak |
| No. 3 | Nestpak | Sawdust | Sawdust<br>Nesting<br>Material | Sawdust<br>Nesting<br>Material |

TABLE 8

Trial 8
Cage Type: Preference System No. 2
Animals: 10 Male MF1 Mice @ 6–8 weeks

| Preference Cage No. | Days 1 & 2 | Days 3 & 4 | Days 5 & 6 | Days 7 & 8 |
|---|---|---|---|---|
| No. 1 | Sawdust | Nestpak | Sawdust<br>Nesting<br>Material | Sawdust |
| No. 2 | Sawdust | Sawdust | Nestpak | Sawdust<br>Nesting<br>Material |

TABLE 8-continued

Trial 8
Cage Type: Preference System No. 2
Animals: 10 Male MF1 Mice @ 6–8 weeks

| Preference Cage No. | Days 1 & 2 | Days 3 & 4 | Days 5 & 6 | Days 7 & 8 |
|---|---|---|---|---|
| No. 3 | Sawdust | Sawdust Nesting Material | Sawdust | Nestpak |

TABLE 9

Trial 9
Cage Type: Preference System No. 3
Animals: 10 Female MF1 Mice @ 6–8 weeks

| Preference Cage No. | Days 1 & 2 | Days 3 & 4 | Days 5 & 6 | Days 7 & 8 |
|---|---|---|---|---|
| No. 1 | Sawdust | Nestpak | Sawdust Nesting Material | Sawdust |
| No. 2 | Sawdust | Sawdust | Nestpak | Sawdust Nesting Material |
| No. 3 | Sawdust | Sawdust Nesting Material | Sawdust | Nestpak |

TABLE 10

Trial 10
Cage Type: Preference System No. 1
Animals: 2 Male & 2 Female MF1 Mice @ 3–4 weeks

| Preference Cage No. | Days 1 & 2 | Days 3 & 4 | Days 5 & 6 | Days 7 & 8 |
|---|---|---|---|---|
| No. 1 | Sawdust | Nestpak | Sawdust Nesting Material | Sawdust |
| No. 2 | Sawdust | Sawdust | Nestpak | Sawdust Nesting Material |
| No. 3 | Sawdust | Sawdust Nesting Material | Sawdust | Nestpak |

TABLE 11

Trial 11
Cage Type: Preference System No. 2
Animals: 1 Female MF1 with litter

| Preference Cage No. | Days 1 & 2 | Days 3 & 4 | Days 5 & 6 | Days 7 & 8 |
|---|---|---|---|---|
| No. 1 | Sawdust | Sawdust Nesting Material | Nestpak | Nestpak |
| No. 2 | Sawdust Nesting Material | Nestpak | Sawdust | Nestpak |
| No. 3 | Nestpak | Sawdust | Sawdust Nesting Material | Sawdust Nesting Material |

Study Results
 Sawdust only
 Sawdust and Shredded Paper
 Nestpaks
1. Hotel Syndrome
Sawdust Only
 Hotel syndrome was displayed by 97% of animals placed in either the standard cages or the preference systems where the animals continually moved from one cage to another.
 Some aggression was displayed by the male Wistar rats aged 8–10 weeks both in the standard cage and preference system.
Sawdust and Shredded Paper
 Hotel syndrome was displayed by 98% of animals placed in either the standard cages or the preference systems, 11% of the animals showed an immediate interest in the shredded paper generally running and displaying play activity with cage mates. One rat in the preference system relocated the shredded paper into the cage with the Nestpak.
Nespaks
 Hotel syndrome was displayed in all animals (100%) when placed in cages/preference systems with only Nestpaks present, in all cases the animals showed some immediate interest in the paks, with 77% of the animals interacted with the Nestpaks immediately on contact, displaying chewing and climbing activities.
2. Burrowing
Sawdust Only
 Within these cages 40% of the animals displayed some form of burrowing activity, ranging from pushing sawdust into mounds and then burrowing underneath, also within the preference systems some animals moved sawdust via the tunnels from one cage to another.
Sawdust and Shredded Paper
 In all cages with sawdust and shredded paper all animals (100%) displayed some form of burrowing activity, this included movement in and out of the shredded paper and also redispersing the paper from one cage to another in the preference systems.
Nestpaks
 Burrowing activity was displayed in all cages, initial activity was to climb and burrow under the Nestpaks, this was followed by gnawing at the packs and then entering in and out of the packs (mice) via the holes that had been made to the total removal of all the sawdust from the packs and then running in and out of the empty pack.
3. Distribution of Contents
 In all cages the bedding and nesting materials where placed in the centre of the cage.
Sawdust Only
 The animals dispersed all the sawdust evenly around the cage, there appeared to be very limited if any attempt to form a nest area with the mice or rats.
Sawdust and Shredded Paper
 The animals dispersed the sawdust around the cage with larger amounts incorporated at the resting site.
Nestpaks
 In all cages the Nestpaks were utilised, once the packs had been gnawed open, the animals removed all of the contents which was then dispersed around the cage.
4. Nesting
Sawdust Only
 Non of the animals in the study attempted to make a nest with sawdust alone in the cages, but did huddle together in one place during resting periods.
Sawdust and Shredded Paper
 When in no other nesting materials were present those animals who made a nest (mainly mice) utilised the shredded paper for this purpose.

Nestpaks

In cages with Nestpaks present 94% of the animals chose to make some form of nesting area with the pack. The pack was either totally chewed up, or in some cases within the preference system, once the animals had removed the sawdust from the Nestpak they then transported the shredded paper from its location and put it into the empty pack to create a nest.

Rats were also observed to utilise the Nestpak more than the other products some form of nest or resting area.

5. Grooming

With both the rats and mice individual and cage mate grooming was continuously observed in all cages with all types of bedding and nesting materials.

6. Resting

Sawdust Only

In all cages animals were observed to huddle together in one area of their cage, this was usually under the food hopper.

Sawdust and Shredded Paper

In single cages and those in the preference system without the presence of Nestpaks a nest was made with the shredded paper.

Nestpaks

In single cages and those in the preference system a nest was always made with the Nestpaks, and when both Nestpaks and Shredded Paper was available (preference systems) the two products were put together to form nest areas.

Conclusion

The aims of the study was to assess whether Nestpaks could improve the environmental activities within animals cages whilst at the same time prove to easy to be more user friendly with increase safety aspects to the operator.

Animals

In single cages sawdust alone did not create much activity apart from "hotel syndrome" whereas when given shredded paper, most animals made some form of nest. However when the Nestpaks were presented a much greater amount of activity was observed, with the animals chewing and burrowing into the packs. In all cases they dispersed the sawdust around the cage and made some form of nest with the paper sacking.

In the preference systems in which each of the three products were presented in one of the three cages, there was a great deal of activity observed, and in all cases the Nestpaks caused enough interest to encourage the animals to tear open the dispense the sawdust and also utilise the pack as nesting material.

Animals are always assured of receiving a quantified measurement of bedding and nesting materials which is good for the animals themselves, and can also be a valuable asset to GLP studies.

Operations

The Nestpaks have shown a great advantage over loose sawdust and nesting materials. Storage Nestpaks can be packed in easy to store cartons or crates making storage safer and only on product to store.

Dispensing there is no need to have separate bedding up areas as there is no spillage, therefore releasing valuable floor space. In the case of IVC racks and isolators, dispensing is made easier within the laminar flow cabinet or the isolator as there is no risk of spillage.

Safety is increased for the operator as there is no dust aerosols from the bedding or nesting materials when dispensed.

Cost effective the amount of bedding and nesting materials dispensed is always the same between different operators, and the time taken to load cages is greatly reduced as only one product is being dispensed.

The trials have proved conclusively that the Nestpaks provide the animals with a valuable stimulus to their environment, whilst being extremely operator friendly.

What is claimed is:

1. Habitat for caged animals comprising a penetrable envelope of food grade material containing litter.

2. Habitat according to claim 1, wherein the envelope is penetrable by chewing.

3. Habitat according to claim 1, wherein the envelope is biodegradable.

4. Habitat according to claim 1, wherein the envelope is edible.

5. Habitat according to claim 1, wherein the litter is biodegradable.

6. Habitat according to claim 1, wherein the litter is absorbent.

7. Habitat according to claim 1, wherein the litter is cellulosic material.

8. Habitat according to claim 1, wherein the litter is paper.

9. Habitat according to claim 1, wherein the litter is sawdust.

10. Habitat according to claim 1, wherein the litter is crushed corncob.

11. Habitat according to claim 1, wherein the litter is hemp.

12. Habitat according to claim 1, wherein said habitat is adapted for nesting rodents.

13. Habitat according to claim 12, wherein said nesting rodents are selected from the group consisting of mice, hamsters and gerbils.

14. Habitat according to claim 1, further comprising a toy.

15. A method of filling an animal enclosure with litter, comprising the steps of placing a habitat comprising a penetrable envelope of food grade material containing litter in said animal enclosure, and introducing an animal into said animal enclosure, wherein said envelope of food grade material is penetrable by said animal when said animal is in said enclosure.

* * * * *